April 2, 1957   DE FOREST LOTT ET AL   2,787,570
REINFORCED SHEET MATERIAL
Filed March 17, 1954

INVENTOR
DE FOREST LOTT
EDWARD G. HAMWAY
BY
Harry O. Ernsberger
ATTORNEY

United States Patent Office 2,787,570
Patented Apr. 2, 1957

2,787,570

REINFORCED SHEET MATERIAL de Forest Lott and Edward G. Hamway, Toledo, Ohio, assignors, by mesne assignments, to The General Tire & Rubber Company, Akron, Ohio, a corporation of Ohio Application March 17, 1954, Serial No. 416,765

3 Claims. (Cl. 154—52)

This invention relates to sheet materials and, more especially, to an article formed of a web or fabric coated with resinous, film-forming material.

Sheet materials have been produced wherein a cotton fabric base is coated on one or both sides with resins such as vinyl resin. Such sheet materials have limitations as to strength and elastomeric characteristics.

Synthetic fibers, such as those of the nylon type, viz., fibers formed from linear, fiber-forming polymeric amides, have specially high strength characteristics, both in monofilament and multifilament form, and are comparatively small size, whereby the weight factor of a sheet material embodying a nylon filament material as a base or core is greatly reduced.

Open mesh materials formed of nylon monofilaments or strands or yarns of multifilament threads may be readily coated with film-forming vinyl resins, providing comparatively light weight sheet materials endowed with high strength characteristics and especially high resistance to tearing. Filaments or fibers of the nylon type have an appreciable coefficient of stretch or elastomeric characteristics which impair their utility for certain uses. For example, in upholstering large pieces of furniture or stretching material over a bow frame to provide a top for a convertible-type vehicle, the stretch characteristic of such fibers renders it difficult to tension the material so as to present a neat appearance and maintain the material in taut condition.

An object of the present invention is the provision of a sheet material embodying a synthetic fiber core or web, reinforced in one direction with inorganic media, the latter having a relatively low coefficient of elongation or stretch, the web or core being coated with a suitable resin, providing a material usable for upholstering or like purposes, or wherever a minimum stretch for a material is desired.

Another object of the invention is the provision of a product embodying a web or core of nylon filaments or similar synthetic filaments, reinforced with spaced, parallel strands, yarns or threads formed of substantially non-stretchable fibers to impart high-strength characteristics to the product in the direction of disposition of the non-stretchable components, the reinforced web or core being coated with thermoplastic, resinous material, suitably plasticized and stabilized to render the product pliable or flexible under various weather conditions whereby the material may be used satisfactorily in places exposed to the weather.

Another object of the invention resides in a method of forming a composite sheet of material wherein a web, open-mesh or scrim fabric is provided with spaced, substantially parallel yarns or strands of inorganic or mineral fibers, coated on both sides with vinyl resin coating or a coating affixed to the web or scrim fabric under heat and pressure conditions, whereby the resin is adhesively joined or bonded inter se through the spaces or interstices of the web or scrim fabric to effectively integrate the resin layers and scrim fabric as a laminated product.

Another object of the invention resides in the provision of reinforced sheet material wherein the reinforcing media provides for some degree of elongation or stretch in a transverse direction and substantially no stretch or elongation in a lengthwise direction.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which.

Figure 1:
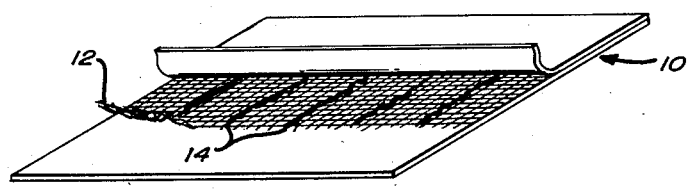
Figure 1 is an isometric view of a portion of a sheet material of our invention illustrating the components in partially disassembled relation.
Figure 2:
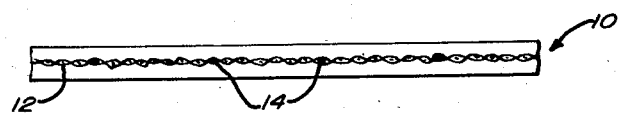
Figure 2 is a sectional view of the material shown in Figure 1.
Figure 3:
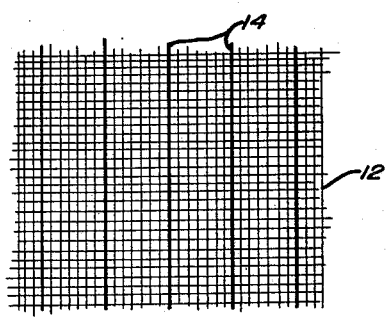
Figure 3 is a plan view showing a type of scrim fabric or web, reinforced by linear material formed of inorganic fibers, forming a component of the sheet material.

Referring to the drawings the coated fabric or sheet material 10 shown in Figure 1 is inclusive of a web, scrim material or fabric 12, preferably formed of synthetic, fiber-forming material, for example, nylon fibers or filaments, viz., fibers or filaments formed from linear polymeric amides or this type of synthetic fibers. It is preferred to use a web or fabric of woven character formed of monofilaments of nylon or the like as the resistance to tear of such fabric when coated with resin is found to be greater than the tear resistance of a web or fabric woven of yarns, strands or threads of multifilaments or staple fibers. A web or open-mesh fabric of the latter character may be used where extremely high resistance to tear is not essential. The fabric may be of any desired mesh, dependent, in a measure, upon the strength characteristics and weight required in the finished product.

The scrim fabric or web 12 is provided with a reinforcing media, preferably extending in only one direction of the material, the reinforcing media being preferably formed of strands, yarns or threads of mineral fibers such, for example, as glass fibers or the like. The glass fiber strands or yarns may be made of continuous glass filaments or staple fiber. The reinforcing strands, yarns or threads of glass fibers or filaments are shown at 14 and are in substantial parallelism as shown in the drawings. The reinforcing strands or yarns may be interwoven with the base fabric or web 12, or they may be disposed on a surface of the fabric 12 and temporarily bonded to the base fabric by a suitable adhesive, pending the application of the coatings of resin to the base fabric. The web or fabric 12 formed of nylon fibers or the like is preferably of an open-mesh material, and a mesh of about 20 to 30 monofilaments or threads per inch has been found to function satisfactorily. An open-mesh material for the web or core is essential in order to provide interstices or spaces through which the resin coatings are adhesively joined or bonded together in the finished material. The glass fiber strands extend in only one direction of the material and function to substantially eliminate stretch of the material in the direction of the reinforcing strands as the stretch of glass fibers is substantially negligible, and they have extremely high-strength characteristics in tension. The number of reinforcing strands embodied in the material is dependent in a large measure upon the strength factors desired in the material in the linear direction of the reinforcing strands, yarns or threads.

As a practical example, the material of the present invention is particularly adapted as a top covering for vehicles of the so-called convertible type, and transverse spacing of the reinforcing strands of ¾ inch to 1 inch in the web or fabric has been found to be satisfactory. It has been found preferable to incorporate the rectilinearly positioned, glass fiber strands in the fabric web by weaving or other means of interlacing the reinforcing strands in the fabric material. In instances where the reinforcing strands, yarns or threads are disposed on one planar surface of the web, the strands may be temporarily secured or joined to the web by a suitable bonding composition such as acrylonitrile butadiene copolymer or polymeric resinous materials such as polyvinyl chloride, vinyl chloride-vinyl acetate copolymer, polyvinyl acetate, polyalkylacrylates and the like.

The coating composition which is applied to each side of the web or fabric and the reinforcing glass fiber strands, yarns or threads may be a suitably plasticized and stabilized high polymeric film-forming material which is rendered plastic at temperatures from 200° to 400° F. and which may be applied by conventional calendering methods. As a suitable coating composition, materials selected from the following may be used: polyvinyl chloride, copolymers of vinyl chloride and vinyl acetate (Vinylite), polyvinylidene chloride, diethyl maleate and vinyl-acetals such as polyvinyl butyral. While application of the coatings to the webby calendering methods is preferred, it is to be understood that the coating material may be applied by doctor blade or other methods, if desired.

The reinforcing strands, yarns or threads of glass fibers incorporated in the product are preferably of the continuous multifilament type, and a strand or thread may include from 40 to 200 or more fine, continuous glass filaments or fibers. As previously mentioned, continuous filament strands are preferred, reinforcing media of staple glass fibers may be used, but the staple fiber yarns or threads have less tensile strength than the continuous filament reinforcement.

The following is a typical example of reinforced resinous sheet material of the present invention which has been found to be admirably suited as a top material for convertible vehicles and general upholstering uses where substantial elimination of stretch in one direction of the material is desirable. The resin component is as follows:

| | |
|---|---|
| Vinyl resin | 100.0 |
| Dioctyl phthalate | 35.0 |
| Dioctyl azelate | 20.0 |
| Epoxy type stabilizer (Paraplex G–62) | 5.0 |
| Filler (calcium carbonate) | 20.0 |
| Pigment | 15.0 |
| Barium cadmium laurate | 2.0 |

The above constituents are set forth in parts by weight in the coating composition. The vinyl resin constituent in the above composition may be polyvinyl chloride or copolymers containing a minor portion (for example, 5%) of copolymerized monomer such as vinyl acetate, vinylidene chloride or diethyl maleate. The vinyl chloride component of the resin may vary from 92% to 95% and the minor proportion of a copolymerized monomer may range between 8% and 5%. Resins of the character hereinbefore mentioned may also be used as a resin constituent of the composition.

In the foregoing example dioctyl phthalate and dioctyl azelate form suitable plasticizers in the composition, although other conventional plasticizers may be used. The Paraplex G–62 (epoxy type stabilizer) and barium cadmium laurate function as stabilizers in the resin.

The film or coating of resin composition is calendered on each side of the fabric or web, and each coating or film is preferably approximately .012 inch thick. A web or fabric formed of nylon monofilaments of 100 denier and having a thread count of 28 x 28 per inch has been found to be satisfactory. The fabric is reinforced with strands, yarns or linear bundles of glass fibers or filaments spaced approximately one inch apart, extending lengthwise of the material and in substantially parallel relation. The finished weight of the product of the above-mentioned example is 26 ounces per square yard and is about .024 inch thick.

The employment in the reinforced coated fabric of the invention of a web or fabric made of nylon monofilaments or monofilaments of other, similar fiber-forming materials is preferred, but a web or fabric woven of multifilament yarns of nylon or similar material may be used.

The sheet material of this invention, embodying reinforcing media of spaced strands, yarns or linear bundles of fibers of substantially nonstretchable material such as glass or other mineral fibers, presents high-strength characteristics in the direction of the reinforcing strands, yarns or bundles, with substantially little elongation or stretch in such direction. The elongation factor of glass fibers does not exceed 3%. The sheet material of the invention is capable of being stretched in a direction normal to the reinforcing media, and hence the material may be fashioned or formed to fit curved contours. The product of the invention may also be used in the upholstering field and for other uses where coated fabrics may be advantageously employed.

It is apparent that, within the scope of the invention, modifications and different arrangements may be made other than is herein disclosed, and the present disclosure is illustrative merely, the invention comprehending all variations thereof.

We claim:

1. Pliable sheet material comprising an open mesh web formed of nylon fibers having interwoven therewith a plurality of yarns of glass fibers which are spaced at least ¾ of an inch apart and extend parallel to each other in only one direction of the web, and a film of plasticized resin on each face of said web which is adhesively joined thereto through the interstices of said web, said resin being selected from the group consisting of polyvinyl chloride, copolymers of vinyl chloride and vinyl acetate, and polyvinylidene chloride.

2. Pliable sheet material comprising an open mesh web formed of high-strength, non-cellulosic synthetic fibers having associated therewith a plurality of laterally-spaced, linear bundles of glass fibers which are spaced at least ¾ of an inch apart and extend parallel to each other in only one direction of the web, and a film of plasticized resin on each face of said web which is adhesively joined thereto through the interstices of said web, said resin being selected from the group consisting of polyvinyl chloride, copolymers of polyvinyl chloride, and vinyl acetate and polyvinylidene chloride.

3. Pliable sheet material comprising an open mesh web formed of nylon fibers having associated therewith a plurality of laterally-spaced, linear bundles of glass fibers which are spaced at least ¾ of an inch apart and extend parallel to each other in only one direction of the web, and a film of plasticized resin on each face of said web which is adhesively joined thereto through the interstices of said web, said resin being selected from the group consisting of polyvinyl chloride, copolymers of polyvinyl chloride, and vinyl acetate and polyvinylidene chloride.

References Cited in the file of this patent

UNITED STATES PATENTS

| | | |
|---|---|---|
| 2,281,635 | Strauss | May 5, 1942 |
| 2,332,373 | Dorough et al. | Oct. 19, 1943 |
| 2,372,983 | Richardson | Apr. 3, 1945 |
| 2,381,061 | Kallmann | Aug. 7, 1945 |
| 2,418,904 | Rugeley et al. | Apr. 15, 1947 |
| 2,428,325 | Collins | Sept. 30, 1947 |
| 2,539,301 | Foster | Jan. 23, 1951 |
| 2,598,090 | Yung et al. | May 27, 1952 |
| 2,648,118 | Ewald | Aug. 11, 1953 |